United States Patent
Chen et al.

(10) Patent No.: US 10,708,993 B2
(45) Date of Patent: Jul. 7, 2020

(54) DRIVER AND LED LAMP COMPRISING DRIVER

(71) Applicant: Current Lighting Solutions, LLC, East Cleveland, OH (US)

(72) Inventors: Longyu Chen, Shanghai (CN); Hongbin Wei, Shanghai (CN)

(73) Assignee: CURRENT LIGHTING SOLUTIONS, LLC, East Cleveland, OH (US)

( * ) Notice: Subject to any disclaimer, the term of this patent is extended or adjusted under 35 U.S.C. 154(b) by 0 days.

(21) Appl. No.: 16/014,095

(22) Filed: Jun. 21, 2018

(65) Prior Publication Data

US 2018/0376553 A1 Dec. 27, 2018

(30) Foreign Application Priority Data

Jun. 21, 2017 (CN) .......................... 2017 1 0474391

(51) Int. Cl.
*H05B 45/37* (2020.01)
*H02M 3/158* (2006.01)
(Continued)

(52) U.S. Cl.
CPC ............ *H05B 45/37* (2020.01); *H02M 3/156* (2013.01); *H02M 3/1582* (2013.01);
(Continued)

(58) Field of Classification Search
CPC ............ H05B 33/0815; H05B 33/0845; H05B 33/0812; H05B 33/0809; H05B 33/0824;
(Continued)

(56) References Cited

U.S. PATENT DOCUMENTS 9,491,817 B2 * 11/2016 Wang .................... H05B 45/10
2013/0038242 A1 * 2/2013 Athalye ................ H05B 45/37
315/297
(Continued)

FOREIGN PATENT DOCUMENTS

CN 101668369 A 3/2010
CN 201766507 U 3/2011
(Continued)

OTHER PUBLICATIONS

Office Action Issued in connection with corresponding Chinese Application No. 201710474391.4 dated Dec. 30, 2019.

*Primary Examiner* — Tung X Le
*Assistant Examiner* — Borna Alaeddini
(74) *Attorney, Agent, or Firm* — Buckley, Maschoff & Talwalkar LLC (57) ABSTRACT

A driver comprises a front-end stage, a back-end stage, and an intermediate controller. The front-end stage comprises a front-end main circuit and a front-end controller, and is configured to rectify an AC input voltage from an external power supply and output a DC bus voltage through output terminals. The back-end stage comprises a buck circuit, and configured to receive the bus voltage from the front-end stage and output a desired DC drive voltage to a load according to an operating voltage of the load. The intermediate controller is configured to obtain a difference voltage signal indicative of an electric potential difference between the bus voltage and the drive voltage, and provide a feedback signal generated based on the difference voltage signal to the front-end controller. The front-end controller controls the front-end main circuit based on the feedback signal to change the bus voltage with change of the drive voltage.

16 Claims, 5 Drawing Sheets

(51) Int. Cl.
  *H02M 7/217* (2006.01)
  *H02M 3/156* (2006.01)
  *H02M 1/00* (2006.01)

(52) U.S. Cl.
  CPC ...... *H02M 7/217* (2013.01); *H02M 2001/007* (2013.01); *H02M 2001/0022* (2013.01)

(58) Field of Classification Search
  CPC .............. H05B 33/083; H05B 33/0842; H05B 33/0848; H05B 33/08; H05B 33/0806; H05B 33/0851; H05B 33/0887; H05B 37/02; H05B 37/0263; H05B 37/029; H05B 39/044; H05B 39/08; H05B 45/37
  See application file for complete search history.

(56) References Cited

U.S. PATENT DOCUMENTS

| | | | | |
|---|---|---|---|---|
| 2013/0049602 | A1* | 2/2013 | Raj | H05B 45/22 315/151 |
| 2013/0175936 | A1* | 7/2013 | Chen | H05B 47/10 315/200 R |
| 2014/0111113 | A1* | 4/2014 | Del Carmen, Jr. | H05B 45/37 315/297 |
| 2014/0239810 | A1* | 8/2014 | Martin-Lopez | H05B 47/10 315/85 |
| 2015/0357902 | A1 | 12/2015 | Hung et al. | |
| 2015/0359053 | A1* | 12/2015 | van den Broeke | H05B 33/0815 315/200 R |

FOREIGN PATENT DOCUMENTS

| | | |
|---|---|---|
| CN | 104467406 A | 3/2015 |
| EP | 1531541 A2 | 5/2005 |

* cited by examiner

DRIVER AND LED LAMP COMPRISING DRIVER

BACKGROUND

Embodiments of the present disclosure generally relate to drivers, and especially to drivers having high efficiency in a wide input range and comprising back-end stage buck circuits, and especially to LED lamps comprising the drivers.

In the LED constant current driving power supply, a two-stage driving circuit is a common technical solution. The two-stage driving circuit comprises a front-end circuit and a back-end circuit, wherein the front-end circuit is configured for power factor correction and constant voltage output control, and the back-end circuit is configured for constant-current output control. The buck circuit is a preferred solution for the back-end circuit. In practical applications, the user's requirements for the efficiency of the LED driver circuit will never stop. In order to adapt to a variety of application occasions, the LED driver circuit is required to have high efficiency not only in full load, but also in light load.

However, when the two-stage driving circuit comprising a buck back-end circuit is in full load, i.e., when an output voltage of the buck circuit is close to an input voltage of the buck circuit, the efficiency of the buck circuit is high. However, when the driving circuit is in light load, i.e., when the output voltage of the buck circuit is much lower than the input voltage of the buck circuit, the efficiency of the buck circuit is low, thereby limiting the efficiency of the driving circuit as a whole.

Therefore, it is desirable to provide a method to solve at least one of the problems described above.

BRIEF DESCRIPTION

A driver for driving a load comprises a front-end stage, a back-end stage, and an intermediate controller. The front-end stage comprises a front-end main circuit and a front-end controller, and is configured to rectify an AC input voltage from an external power supply and output a DC bus voltage through output terminals. The back-end stage comprises a buck circuit, and configured to receive the bus voltage from the front-end stage and output a desired DC drive voltage to the load according to an operating voltage of the load. The intermediate controller is configured to obtain a difference voltage signal indicative of an electric potential difference between the bus voltage and the drive voltage, and provide a feedback signal which is generated based on the difference voltage signal to the front-end controller, wherein the front-end controller controls the front-end main circuit based on the feedback signal to change the bus voltage with change of the drive voltage.

An LED lamp for connecting to an external power supply comprises: a lighting source including a plurality of LEDs, and a driver configured for driving the lighting source.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

In an effort to provide a concise description of these embodiments, not all features of an actual implementation are described in one or more specific embodiments. It should be appreciated that in the development of any such actual implementation, as in any engineering or design project, numerous implementation-specific decisions must be made to achieve the developers' specific goals, such as compliance with system-related and business-related constraints, which may vary from one implementation to another.

Unless defined otherwise, technical and scientific terms used herein have the same meaning as is commonly understood by one of ordinary skill in the art to which the present disclosure belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items. The use of "including," "comprising," or "having," and variations thereof herein are meant to encompass the items listed thereafter and equivalents thereof as well as additional items. The terms "connecting", "connected", "coupled" and the like are not limited to physical or mechanical connections, but may include direct or indirect electrical connections, and so on.

Figure 1:
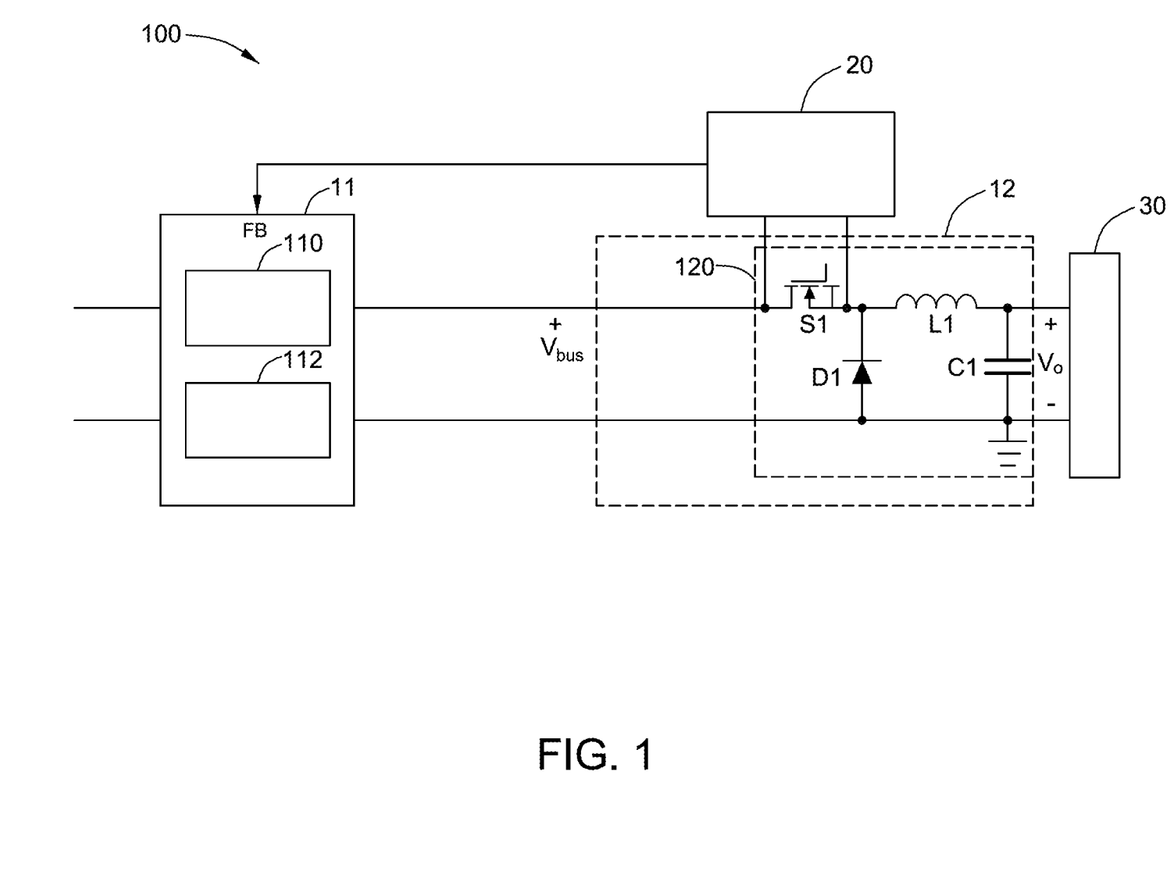
FIG. 1 is a block diagram of a driver 100 in accordance with an exemplary embodiment of the present disclosure.

FIG. 1 shows a schematic diagram of a driver 100 according to an exemplary embodiment of the present disclosure. As shown in FIG. 1, the driver 100 can be used to drive any load 30 requiring a DC current/voltage, such as a light emitting diode light string, but is not limited thereto. The driver 100 comprises a front-end stage 11, a back-end stage 12, and an intermediate controller 20, wherein the front-end stage 11 comprises a front-end main circuit 110 and a front-end controller 112, and is configured to convert an AC input voltage provided by an external power supply into a DC bus voltage Vbus and output the DC bus voltage through output terminals. The back-end stage 12 receives the bus voltage Vbus from the front-end stage 11 and outputs a desired DC drive voltage Vo to the load according to an actual operating voltage of the load. The intermediate controller 20 is configured to generate a difference voltage signal indicative of an electric potential difference between the bus voltage Vbus and the drive voltage Vo, generate a feedback signal based on the difference voltage signal, and provide the feedback signal to the front-end controller 112. The front-end controller 112 uses the feedback signal to control the front-end main circuit 110, in such a manner that the bus voltage Vbus changes with the drive voltage Vo, wherein the difference voltage signal is proportional to the electric potential difference between the bus voltage Vbus and the drive voltage Vo.

In conventional solutions, when the driver is in light load, an output voltage of a buck circuit is much lower than an input voltage of the buck circuit, and an efficiency of the buck circuit is very low, thereby limiting an efficiency of the entire driver in light load. Based on this, the present disclosure conceives a technical solution in which the bus voltage Vbus, i.e., the input voltage of the buck circuit, follows the output voltage Vo of the buck circuit, thereby ensuring that a difference between the input and output voltage is within a certain range and improving the efficiency of the buck circuit and the entire driver.

Continuing referring to FIG. 1, the back-end stage 12 comprises a buck circuit 120. The buck circuit 120 comprises a controllable switch S1, a diode D1, and an inductor L1. In the present embodiment, the buck circuit 120 also comprises a capacitor C1 for filtering. The buck circuit 120 adopts a switch floated topology structure. In this topology, the controllable switch S1 is not grounded. The specific connection is as following. A cathode of the diode D1 is connected to one terminal of the inductor L1, and one terminal of the capacitor C1 is connected to the other terminal of the inductor L1. An anode of the diode D1 and the other terminal of the capacitor C1 are commonly connected to a negative terminal of the output terminals, and the negative terminal of the output terminals is grounded. A first electrode of the controllable switch S1 is connected to a positive terminal of the output terminals, and the second electrode of the controllable switch S1 is connected to the cathode of the diode D1.

Figure 2:
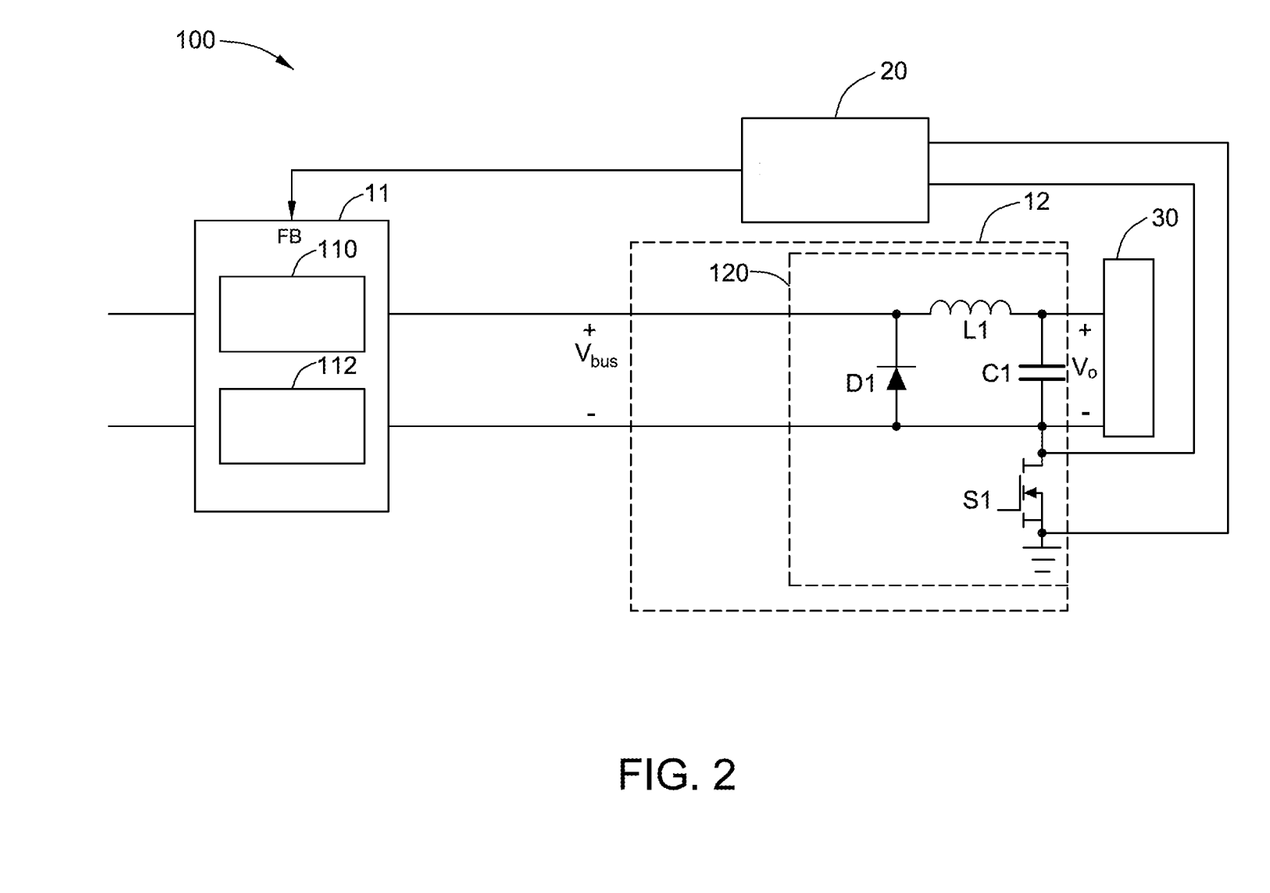
FIG. 2 is a block diagram of a driver 100 in accordance with an exemplary embodiment of the present disclosure.

FIG. 2 shows a schematic diagram of a driver 100 according to another exemplary embodiment of the present disclosure. Compared with FIG. 1, FIG. 2 differs only in that the buck circuit 120 adopts an output floated topology structure. In this topology, an output terminal of the buck circuit 120 is not grounded. The specific connection is as following. A cathode of the diode D1 connected to one terminal of the inductor L1 is further connected to the positive terminal of the output terminals. One terminal of the capacitor C1 is connected to the other terminal of the inductor L1. An anode of the diode D1 and the other terminal of the capacitor C1 are connected to the negative terminal of the output terminals. A first electrode of the controllable switch S1 is connected to the negative terminal of the output terminals and a second electrode of the controllable switch S1 is grounded.

The two topologies shown in FIG. 1 and FIG. 2 are circuit topologies often applied in actual drivers. The technical solution for improving efficiency proposed by the present disclosure is applicable to both two topologies. For simplicity, in the following description, only the topology shown in FIG. 1 will be taken as an example for illustration.

Figure 3:
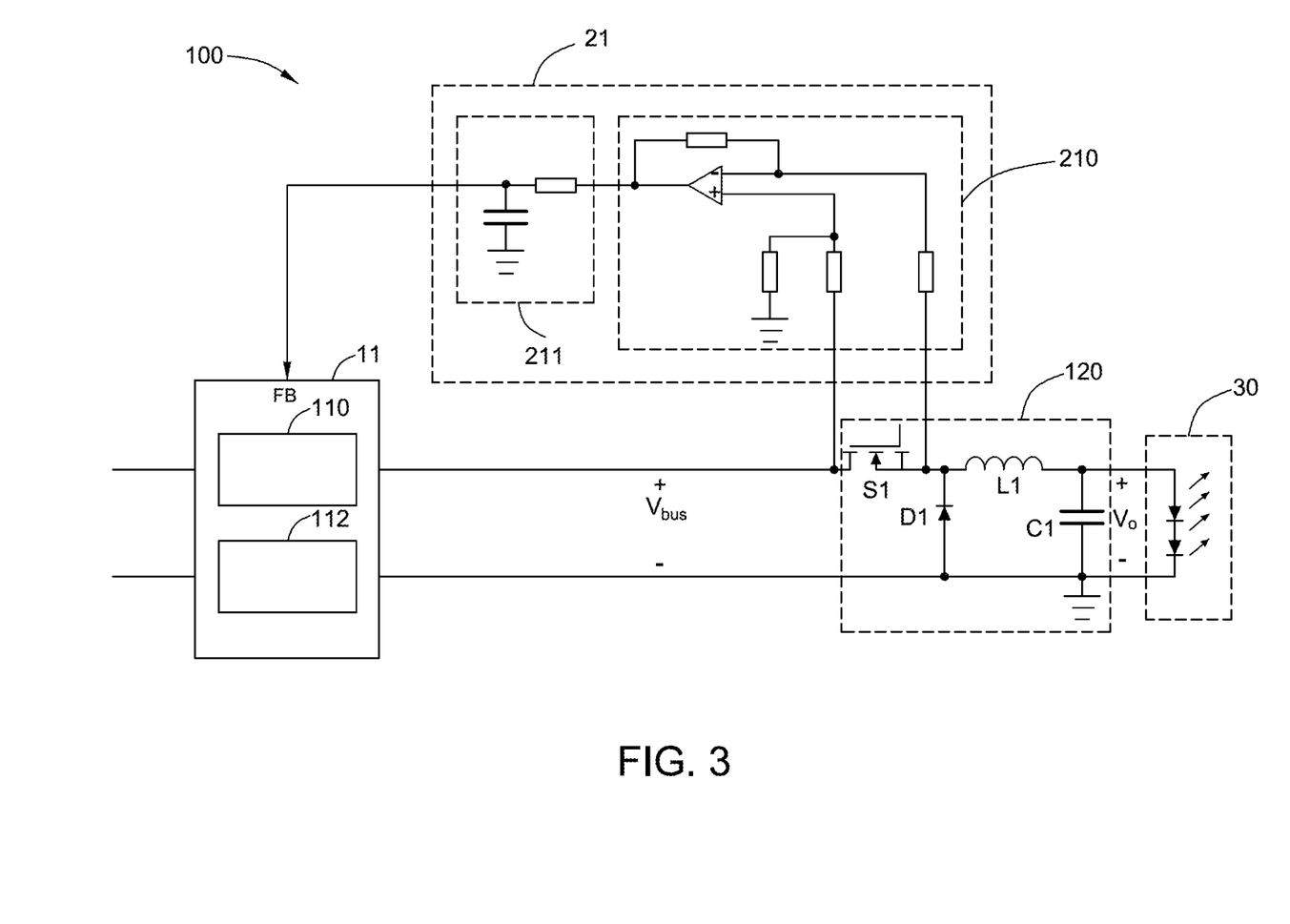
FIG. 3 is a circuit diagram of an intermediate controller 20 of the driver in FIG. 1.

FIG. 3 shows a specific structure of the intermediate controller 20. As shown in FIG. 3, the intermediate controller 20 comprises a first module 21 for generating the difference voltage signal. The first module 21 comprises a differential sampling circuit 210 and a filter circuit 211. One input terminal of the differential sampling circuit 210 is connected to the first electrode of the controllable switch, and the other input terminal of the differential sampling circuit is connected to the second electrode of the controllable switch. The differential sampling circuit 210 samples the voltages at the two electrodes and outputs a signal proportional to a potential difference between the first electrode and the second electrode. The filter circuit 211 filters an output of the differential sampling circuit 210 and outputs the desired difference voltage signal. When the controllable switch S1 is turned on, the potential difference between the first electrode and the second electrode obtained by the differential sampling circuit 210 is close to zero. When the controllable switch S1 is turned off, the potential difference between the first electrode and the second electrode obtained by the differential sampling circuit 210 is a product of the bus voltage and a sampling factor. According to a relation between the input voltage, the output voltage, and a duty ratio of the buck circuit 120 in a continuous conduction mode, it can be obtained that the filtered voltage and a potential difference between the input and output of the buck circuit 120 satisfy a proportional relation having a scale factor determined by the sampling factor associated with the sampling circuit.

Figure 4:
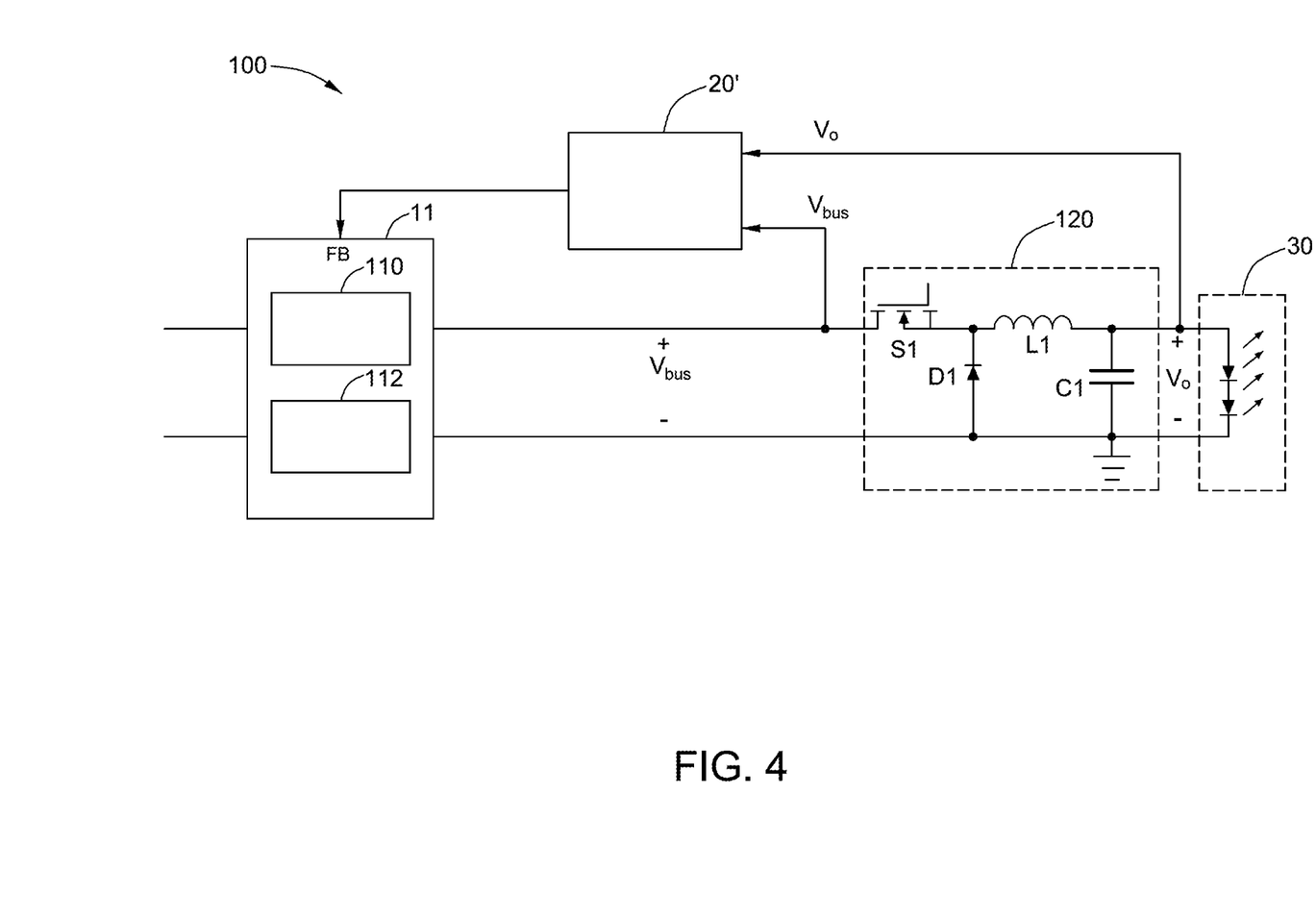
FIG. 4 is a circuit diagram of an intermediate controller 20' of the driver in FIG. 1.

Therefore, in this embodiment, the potential difference between the first electrode and the second electrode of the controllable switch S1 is obtained by the differential sampling circuit, and the potential difference is further filtered by the filter circuit. The result exactly reflects the electric potential difference between the bus voltage and the drive voltage. In another alternative embodiment, as shown in FIG. 4, the driver comprises an intermediate controller 20'. The intermediate controller 20' receives a sensing signal of the bus voltage and a sensing signal of the drive voltage as input and generates the difference voltage signal.

Referring to FIG. 3, in this embodiment, the difference voltage signal is directly provided to the front-end controller 112 as the feedback signal. The front-end controller 112 controls the difference voltage signal to follow a predefined difference voltage reference based on the difference voltage signal and the predefined difference voltage reference, so as to maintain the electric potential difference between the bus voltage and the drive voltage within a predetermined range.

Figure 5:
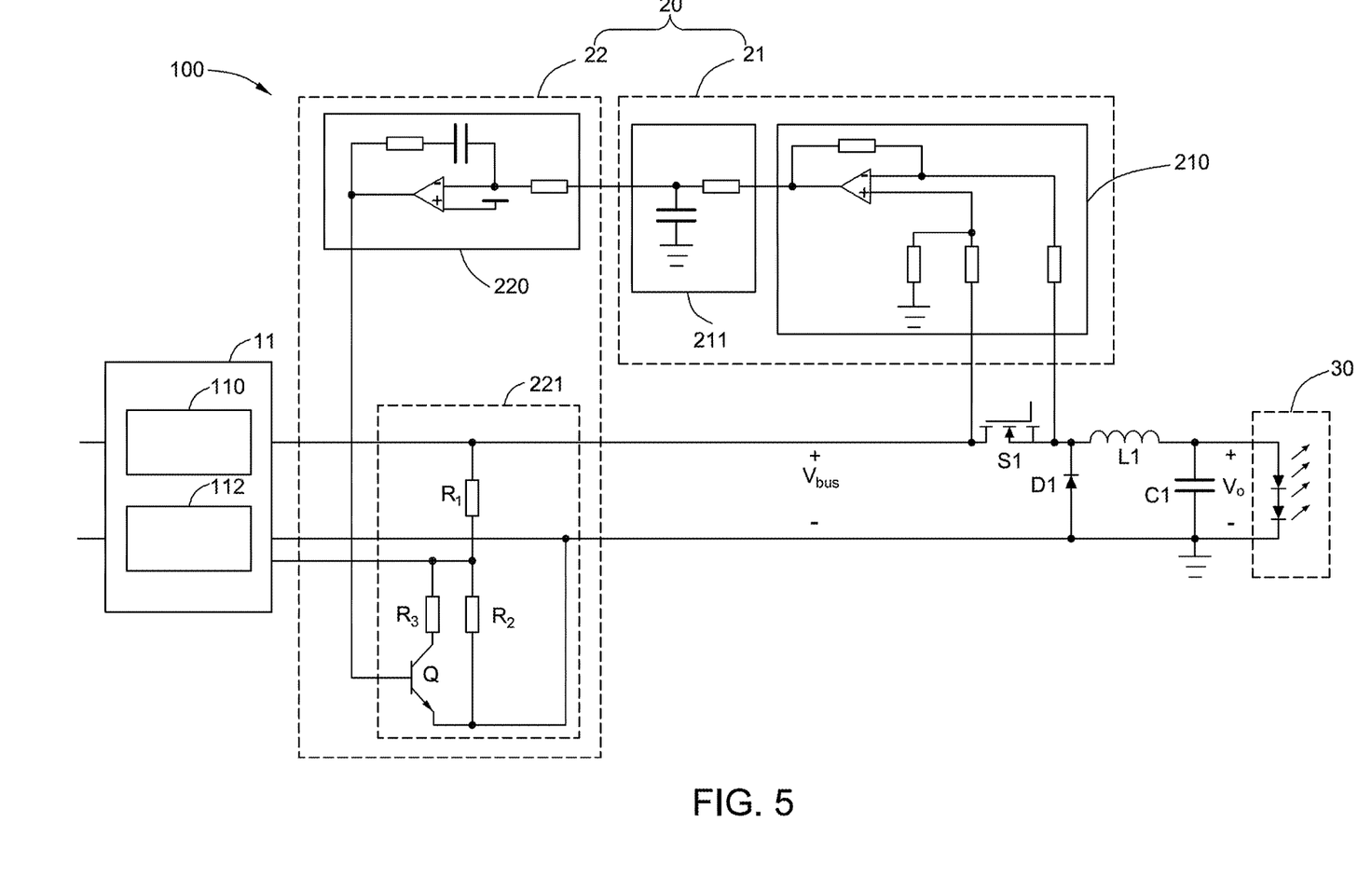
FIG. 5 is another circuit diagram of an intermediate controller 20 of the driver in FIG. 1.

FIG. 5 shows another solution of an intermediate controller according to an exemplary embodiment of the present disclosure. As shown in FIG. 5, the intermediate controller 20 further comprises a second module 22. The second module 22 receives the difference voltage signal as an input and generates a modulated bus voltage signal. The modulated bus voltage signal is obtained by dividing the bus voltage and is linearly related to the bus voltage. Further, the modulated bus voltage signal is provided to the front-end controller 112 as the feedback signal. The modulated bus voltage signal is used as a feedback quantity, and a predetermined bus voltage reference is used as a reference quantity. The front-end controller 112 controls the modulated bus voltage signal to follow the bus voltage reference so that the bus voltage follows the change in the drive voltage. thereby indirectly maintaining the electric potential difference between the bus voltage and the drive voltage within a predetermined range.

As shown in FIG. 5, in the present solution, the difference voltage signal is not directly provided to the front-end controller 112, but is provided to the front-end controller 112 after being transferred by the second module 22, wherein the second module 22 comprises a first circuit 220 connected to the first module 21 and a second circuit 221 comprising a transistor Q. The first circuit 220 is a closed-loop compensation circuit. After the difference voltage signal is modulated by the first circuit 220, the result is provided to a base of the transistor Q to control an on-resistance of the transistor. When the on-resistance of the transistor changes, a voltage value provided to the front-end controller 112 by the second circuit 221 will change accordingly, i.e., the modulated bus voltage signal will change, thereby affecting the control on the bus voltage by the front-end controller 112. Therefore, the bus voltage will change with the difference voltage signal, indirectly maintaining the electric potential difference between the bus voltage and the drive voltage within the predetermined range.

Continuing referring to FIG. 5, the second circuit 221 further comprises a first resistor R1, a second resistor R2 and a third resistor R3, connection of which is as following. The first resistor R1 is connected in series with the second resistor R2. The third resistor R3 is connected in series with the transistor Q. The first resistor R1 and the second resistor R2 connected in series are connected in parallel to the output terminals, and a common connection point between the first resistor R1 and the second resistor R2 is connected with the front-end controller 112. The third resistor R3 and the transistor are connected in parallel with the second resistor R2. In the second circuit 221, the first resistor R1, the second resistor R2 and the parallel branch thereof divide the bus voltage, and the voltage divided by the second resistor R2 and its parallel branch is provided to the front-end controller 112 as the feedback signal. An equivalent resistance of the second resistor R2 and its parallel branch can be changed by controlling the on-resistance of the transistor Q, thereby controlling the voltage signal fed back to the front-end controller 112.

The present disclosure also proposes an LED lamp that is directly connected to an external commercial power source. The LED lamp comprises a light source including a plurality of LEDs and a driver. The driver may be any of the drivers described above in the specification, which is configured to drive the light source to work.

The specification uses detailed embodiments to describe the present disclosure, including the best mode, and can help any person skilled in the art of the disclosure to perform experimental operations. These operations include using any device and system and using any specific method. The scope of the disclosure is defined by the claims, and may include other examples that occur in the technical field. Such other examples are intended to be within the scope of the claims of the disclosure if they are not structurally different from the literal language of the claims or they have equivalent structures as described in the claims.

The invention claimed is:

1. A driver for driving a load, comprising: a front-end stage, a back-end stage, and an intermediate controller, wherein
the front-end stage comprises a front-end main circuit and a front-end controller, and is configured to rectify an AC input voltage from an external power supply and output a DC bus voltage through output terminals;
the back-end stage comprises a buck circuit, and configured to receive the DC bus voltage from the front-end stage and output a desired DC drive voltage to the load according to an operating voltage of the load, wherein the DC bus voltage is greater than the desired DC drive voltage; and
the intermediate controller is configured to obtain a difference voltage signal indicative of an electric potential difference between the bus voltage and the drive voltage, and provide a feedback signal which is generated based on the difference voltage signal to the front-end controller, wherein the front-end controller controls the front-end main circuit based on the feedback signal to change the bus voltage with change of the drive voltage.

2. The driver as claimed in claim 1, wherein the buck circuit comprises a controllable switch, a diode and an inductor;
wherein the buck circuit adopts a switch floated topology structure or an output floated topology structure.

3. The driver as claimed in claim 2, wherein the intermediate controller comprises a first module configured to generate the difference voltage signal, and the first module comprising:
a differential sampling circuit, wherein a first electrode of the controllable switch is connected with one input terminal of the differential sampling circuit and a second electrode of the controllable switch is connected with the other input terminal of the differential sampling circuit and the differential sampling circuit outputs a scaled potential difference between the first electrode of the controllable switch and the second electrode of the controllable switch; and
a filter circuit which filters an output of the differential sampling circuit and outputs the difference voltage signal.

4. The driver as claimed in claim 3, wherein
the difference voltage signal is directly provided to the front-end controller as the feedback signal; and
the front-end controller is configured to control the difference voltage signal to follow a predefined difference voltage reference based on the difference voltage signal and the predefined difference voltage reference, so as to maintain the electric potential difference between the bus voltage and the drive voltage within a predetermined range.

5. The driver as claimed in claim 3, wherein the intermediate controller further comprises a second module configured to receive the difference voltage signal as input and produce a modulated bus voltage signal;
wherein the modulated bus voltage signal is provided to the front-end controller as the feedback signal; and
wherein the front-end controller is configured to control the modulated bus voltage signal to follow a predefined bus voltage reference based on the modulated bus voltage signal and the predefined bus voltage reference, so as to maintain the electric potential difference between the bus voltage and the drive voltage within a predetermined range.

6. The driver as claimed in claim 5, wherein the second module comprises a first circuit coupled to the first module and a second circuit comprising a transistor,
wherein the first circuit is configured to receive the difference voltage signal and provide a base control signal which is generated based on the difference voltage signal to a base electrode of the transistor; and
wherein the second circuit is configured to generate the modulated bus voltage signal based on the base control signal.

7. The driver as claimed in claim 6, wherein the first circuit comprises a closed-loop compensation circuit for receiving a potential difference reference between the bus voltage and the drive voltage, and the difference voltage signal, and generating the base control signal.

8. The driver as claimed in claim 6, wherein the second circuit comprises a first resistor, a second resistor connected in series with the first resistor and a third resistor connected in series with the transistor, the first resistor and the second resistor are connected in parallel with the output terminals, a common terminal of the first resistor and the second resistor is connected with the front-end controller, and the third resistor and the transistor are connected in parallel with the second resistor.

9. The driver as claimed in claim 2, wherein the driver comprises the intermediate controller configured to receive a sensing signal of the bus voltage and a sensing signal of the drive voltage as input and generate the difference voltage signal.

10. The driver as claimed in claim 9, wherein
the difference voltage signal is directly provided to the front-end controller as the feedback signal; and
the front-end controller is configured to control the difference voltage signal to follow a predefined difference voltage reference based on the difference voltage signal and the predefined difference voltage reference, so as to maintain the electric potential difference between the bus voltage and the drive voltage within a predetermined range.

11. The driver as claimed in claim 9, wherein the intermediate controller further comprises a second module configured to receive the difference voltage signal as input and produce a modulated bus voltage signal;
wherein the modulated bus voltage signal is provided to the front-end controller as the feedback signal; and
wherein the front-end controller is configured to control the modulated bus voltage signal to follow a predefined bus voltage reference based on the modulated bus voltage signal and the predefined bus voltage reference, so as to maintain the electric potential difference between the bus voltage and the drive voltage within a predetermined range.

12. The driver as claimed in claim 11, wherein the second module comprises a first circuit coupled to the first module and a second circuit comprising a transistor,
wherein the first circuit is configured to receive the difference voltage signal and provide a base control signal which is generated based on the difference voltage signal to a base electrode of the transistor; and
wherein the second circuit is configured to generate the modulated bus voltage signal based on the base control signal.

13. The driver as claimed in claim 12, wherein the first circuit comprises a closed-loop compensation circuit for receiving a potential difference reference between the bus voltage and the drive voltage, and the difference voltage signal, and generating the base control signal.

14. The driver as claimed in claim 12, wherein the second circuit comprises a first resistor, a second resistor connected in series with the first resistor and a third resistor connected in series with the transistor, the first resistor and the second resistor are connected in parallel with the output terminals, a common terminal of the first resistor and the second resistor is connected with the front-end controller, and the third resistor and the transistor are connected in parallel with the second resistor.

15. An LED lamp for connecting to an external power supply, comprising:
a lighting source including a plurality of LEDs; and
a driver, configured for driving the lighting source, the driver comprising:
a front-end stage comprising a front-end main circuit and a front-end controller, and configured to rectify an AC input voltage from the external power supply and output a DC bus voltage through output terminals,
a back-end stage comprising a buck circuit, and configured to receive the DC bus voltage from the front-end stage and output a desired DC drive voltage to the load according to an operating voltage of the load, wherein the DC bus voltage is greater than the desired DC drive voltage, and
an intermediate controller, configured to obtain a difference voltage signal indicative of an electric potential difference between the bus voltage and the drive voltage, and provide a feedback signal which is generated based on the difference voltage signal to the front-end controller, wherein the front-end controller controls the front-end main circuit based on the feedback signal to change the bus voltage with change of the drive voltage.

16. A driver for driving a load, comprising: a front-end stage, a back-end stage, and an intermediate controller, wherein
the front-end stage comprises a front-end main circuit and a front-end controller, and is configured to rectify an AC input voltage from an external power supply and output a DC bus voltage through output terminals;
the back-end stage comprises a buck circuit, and configured to receive the bus voltage from the front-end stage and output a desired DC drive voltage to the load according to an operating voltage of the load, wherein the buck circuit comprises a controllable switch, a diode and an inductor, and the buck circuit adopts a switch floated topology structure or an output floated topology structure; and
the intermediate controller is configured to obtain a difference voltage signal indicative of an electric potential difference between the bus voltage and the drive voltage, and provide a feedback signal which is generated based on the difference voltage signal to the front-end controller, wherein the front-end controller controls the front-end main circuit based on the feedback signal to change the bus voltage with change of the drive voltage;
wherein the intermediate controller comprises a first module configured to generate the difference voltage signal, and the first module comprising:
a differential sampling circuit, wherein a first electrode of the controllable switch is connected with one input terminal of the differential sampling circuit and a second electrode of the controllable switch is connected with the other input terminal of the differential sampling circuit and the differential sampling circuit outputs a scaled potential difference between the first electrode of the controllable switch and the second electrode of the controllable switch; and
a filter circuit which filters an output of the differential sampling circuit and outputs the difference voltage signal.

* * * * *